(12) United States Patent
Chszaniecki

(10) Patent No.: US 7,011,112 B2
(45) Date of Patent: Mar. 14, 2006

(54) DIVERTER VALVE FOR AN EXTRUDER, IN PARTICULAR A TWIN-SCREW EXTRUDER

(75) Inventor: Gregor Chszaniecki, Hannover (DE)

(73) Assignee: Berstorff GmbH, Hannover (DE)

( * ) Notice: Subject to any disclaimer, the term of this patent is extended or adjusted under 35 U.S.C. 154(b) by 0 days.

(21) Appl. No.: 11/041,937

(22) Filed: Jan. 26, 2005

(65) Prior Publication Data

US 2005/0189025 A1   Sep. 1, 2005

Related U.S. Application Data

(63) Continuation of application No. PCT/EP03/08028, filed on Jul. 23, 2003.

(30) Foreign Application Priority Data

Jul. 27, 2002 (DE) ............................. 102 34 228

(51) Int. Cl.
*F16K 11/10* (2006.01)
(52) U.S. Cl. ...................... 137/876; 100/145
(58) Field of Classification Search ............... 137/876; 366/83, 84, 85, 89; 100/145, 146; 72/270
See application file for complete search history.

(56) References Cited

U.S. PATENT DOCUMENTS 3,589,163 A   6/1971   Byrne et al.
4,321,026 A   3/1982   Lambertus
4,416,605 A   11/1983  Konno et al.
4,984,977 A   1/1991   Grimminger et al.
6,609,819 B1 * 8/2003  Hauck et al. ................. 366/85

FOREIGN PATENT DOCUMENTS

DE   19 37 862         2/1971
DE   21 53 962         8/1972
DE   101 51 434 A1     4/2003

* cited by examiner

*Primary Examiner*—John Fox
(74) *Attorney, Agent, or Firm*—Crowell & Moring LLP

(57) ABSTRACT

A diverter valve is provided for an extruder, especially a twin-screw extruder, that allows for the replacement of the extruder screws without dismounting the same. The diverter valve includes a valve housing with a first flow passage, which can be fastened indirectly or directly to an extruder cylinder, whereby the valve housing can be arranged on the extruder cylinder with the first flow passage aligned with the screw area. The cross section of the first flow passage is constructed large enough to pass extruder screws arranged in the extruder through the flow passage. The diverter valve further includes a valve bolt having its axis arranged basically perpendicular in relation to the direction of flow of a liquid or a melt, with at least an additional flow passage, which can be oriented in alignment with the first flow passage of the valve housing and whose cross section is likewise constructed large enough to pass extruder screws arranged in the extruder through this second flow passage, whereby the valve bolt is arranged adjustably in the valve housing.

17 Claims, 4 Drawing Sheets

DIVERTER VALVE FOR AN EXTRUDER, IN PARTICULAR A TWIN-SCREW EXTRUDER

CROSS-REFERENCE TO RELATED APPLICATIONS

This application is a continuation of PCT Application No. PCT/EP03/08028 filed on Jul. 23, 2003, which claims priority to German Application No. 102 34 228.8 filed Jul. 27, 2002.

BACKGROUND AND SUMMARY OF THE INVENTION

The present invention concerns a diverter valve for an extruder, especially a twin-screw extruder.

Typically, diverter valves are used to simplify the starting process for extruders, especially twin-screw extruders, and in particular for extruders used for granulation. Only by using a diverter value can the point time of the exit of melts from the cutting plate and, therewith, the correct time for turning on the granulator and transport water, be precisely ascertained.

Diverter valves, which are commercially available, must nonetheless be completely, including the subsequent granulator (for example, an underwater granulator), dismantled and removed before the screw can be pulled out of the extruder housing.

Reference is made generally to German patent document DE 101 51 434 regarding an underwater granulator with a pivoted water tube conduit, in which the advantages of an underwater granulator, which can be folded away in a simple manner, are described.

Generally, in the case of an underwater granulator, a rotating blade tool of a cutting device cuts up a large number of strands of melts, which are pressed through a die plate equipped with bores, into short pieces. This leads to pellets. The underwater granulator is coupled to the extruder during operation, preferably while interposing the aforementioned diverter valve.

The swiveling underwater granulator in accordance with DE 101 51 434 already clears the space in front of the extruder in its folded away state. When using a cutting plate with quick couplings, it can be dismounted in the shortest time possible to pull the extruder screw out of the extruder housing when the diverter valve is dispensed with.

The object of the present invention is to provide a diverter valve that is designed for use in connection with an extruder, especially a twin-screw extruder, and guarantees rapid dismounting of the extruder screws (worm gears).

This objective is accomplished by providing a diverter valve for an extruder, especially a twin-screw extruder, including a valve housing with a first flow passage, which can be fastened indirectly or directly on an extruder cylinder, whereby the valve housing can be arranged on the extruder cylinder with a first flow passage that can be arranged in alignment with the screw area, and the cross section of the first flow passage is constructed large enough in order to pass extruder screws arranged in the extruder through the flow passage, as well as a valve bolt arranged with its axis basically perpendicular to the direction of flow of a liquid or a melt in the valve housing, with at least one further through flow passage which can be arranged in a position that is aligned with the first flow passage of the valve housing and whose cross section is likewise constructed large enough to pass the extruder screws arranged in the extruder through this second flow passage, whereby the valve bolt is arranged adjustably in the valve housing.

Accordingly, a valve housing with a first flow passage is connected to the extruder. The valve housing accommodates a valve bolt, the axis of which is arranged basically perpendicular to the direction of flow of the fluid or the melt. The valve bolt has a second flow passage, which can be matched with the first flow passage of the valve housing to produce a general opening through the diverter valve. The two flow passages are constructed in terms of their dimension such that the extruder screws arranged in the extruder can be drawn through the overall flow passage. In this way, a diverter valve does not represent any hindrance for dismounting or mounting the extruder screws. If a twin-screw extruder is used, the flow passages can preferably be constructed in the form of spectacle-type (eyeglass shaped) bore holes.

A basically groove-like recess is arranged on the outer periphery of the valve bolt in addition to the second flow passage in the valve bolt, axially at the same height, but radially offset. With this groove-like recess, a melt flow that is introduced through an inlet channel into the diverter valve can be guided in one position of the valve bolt into a starting channel around and out of the diverter valve. In another position of the bolt, the second flow passage connects the inlet and outlet channel of the first flow passage of the valve housing. Switching can take place by rotating the valve bolt about its axis of rotation. Alternatively, the switch can also take place by sliding the valve bolt.

In order to keep the diameter of the bolt as small as possible, the latter is arranged in the valve housing such that the central axes of the extruder screw or the extruder screws intersect about the central axis of the bolt.

Of course, the valve bolt can be manually activated. Alternatively, activation though a drive, for example a hydraulic or electric drive, is possible. The diverter valve can be designed as a separate part. Nonetheless, an embodiment in which it is incorporated in an extruder is also advantageous. For this, the bore hole for the seat of the pivot bolt can be inserted in the extruder cylinder.

Other objects, advantages and novel features of the present invention will become apparent from the following detailed description of the invention when considered in conjunction with the accompanying drawings.

DETAILED DESCRIPTION OF THE DRAWINGS

Figure 1:
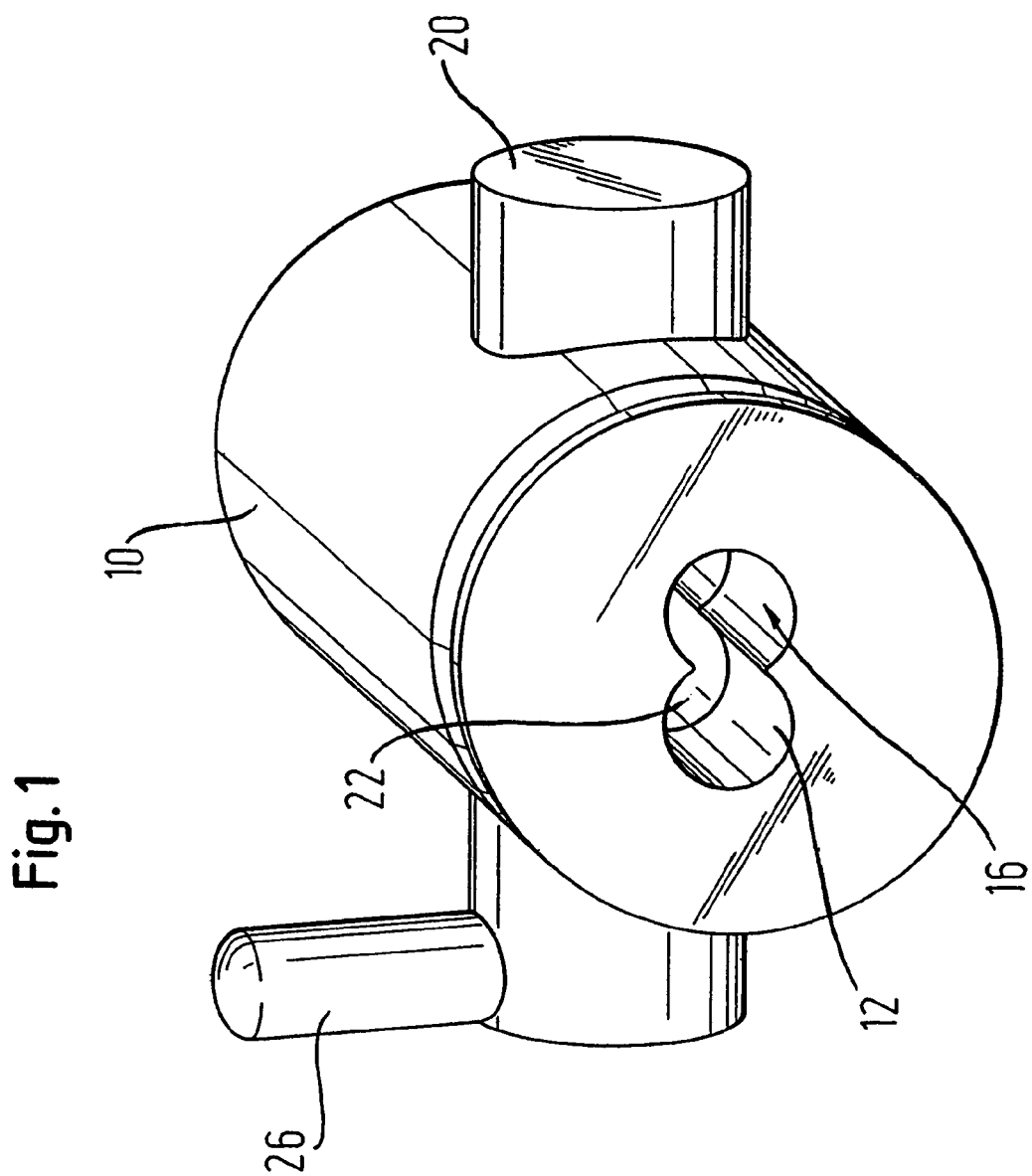
FIG. 1 is a perspective schematic representation of a diverter valve of the invention in accordance with a first embodiment.
Figure 2:
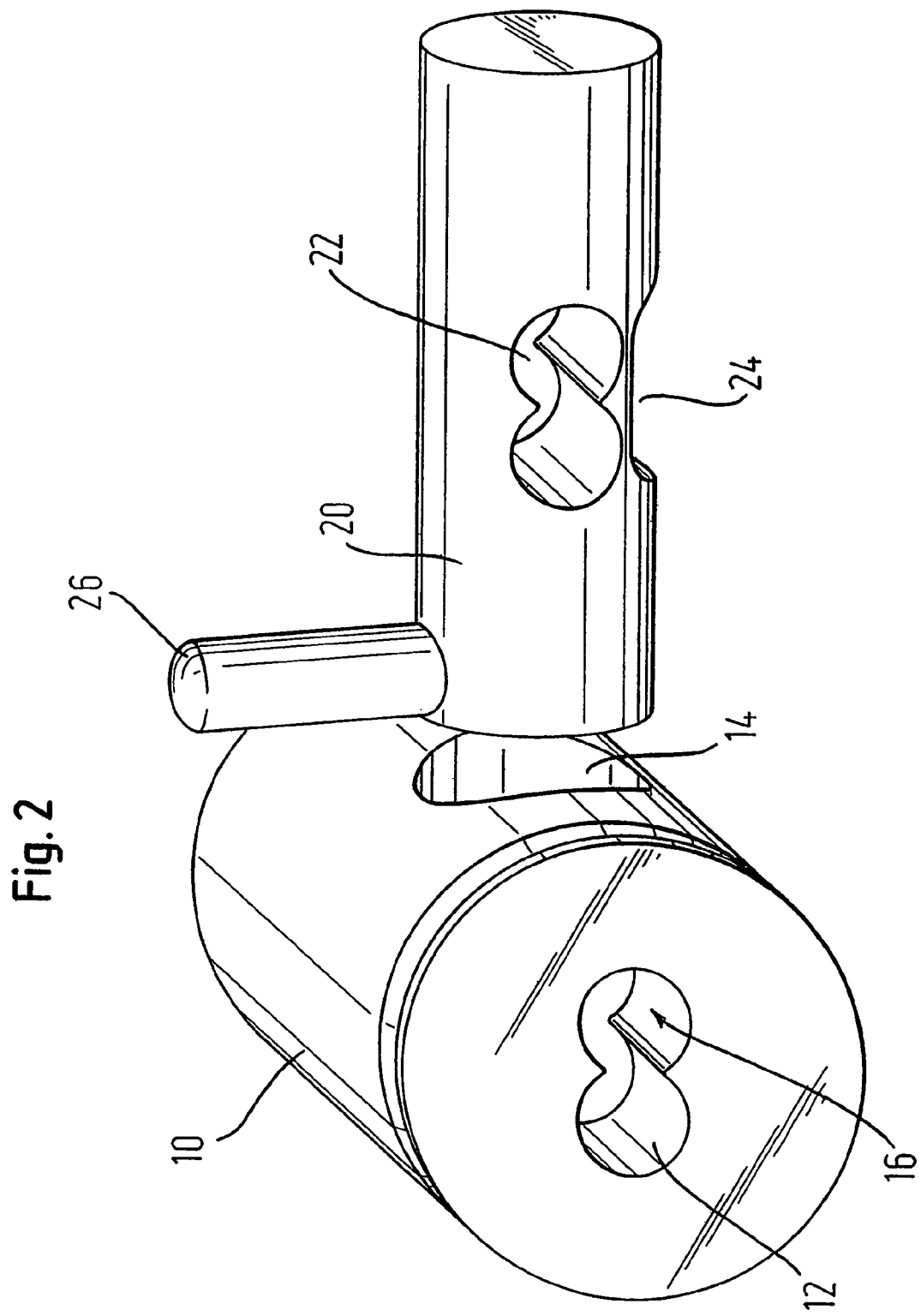
FIG. 2 is a schematic representation like FIG. 1, but with the bolt and the housing arranged side by side.

In the present embodiment, a diverter valve 10 pursuant to the invention is represented separately and without installation on an extruder. The diverter valve of the invention is provided on the output side end of an extruder in the usual application, possibly between an extruder and a screen device and/or an extruder and a pelletizing device.

The diverter valve includes a basically cylindrical housing 10, in which a spectacle-type borehole 12 is arranged axially in the center in the direction of the rotational and longitudinal axes.

A borehole 14 is arranged in the valve housing 40, oriented transversely in relation to the longitudinal axis of the cylindrical housing 10 as well as in relation to the orientation of the spectacle-type borehole 12, wherein a valve bolt 20 is rotatably accommodated with an exact fit in the housing.

The valve bolt 20 likewise has a spectacle-type borehole 22 such that it can be oriented in a position with the spectacle-type borehole 12 by rotating the bolt 20 in the housing 10. Moreover, an approximately groove-like recess 24 on the exterior of the valve bolt 20 is arranged axially at the same height, but radially offset.

Figure 3:
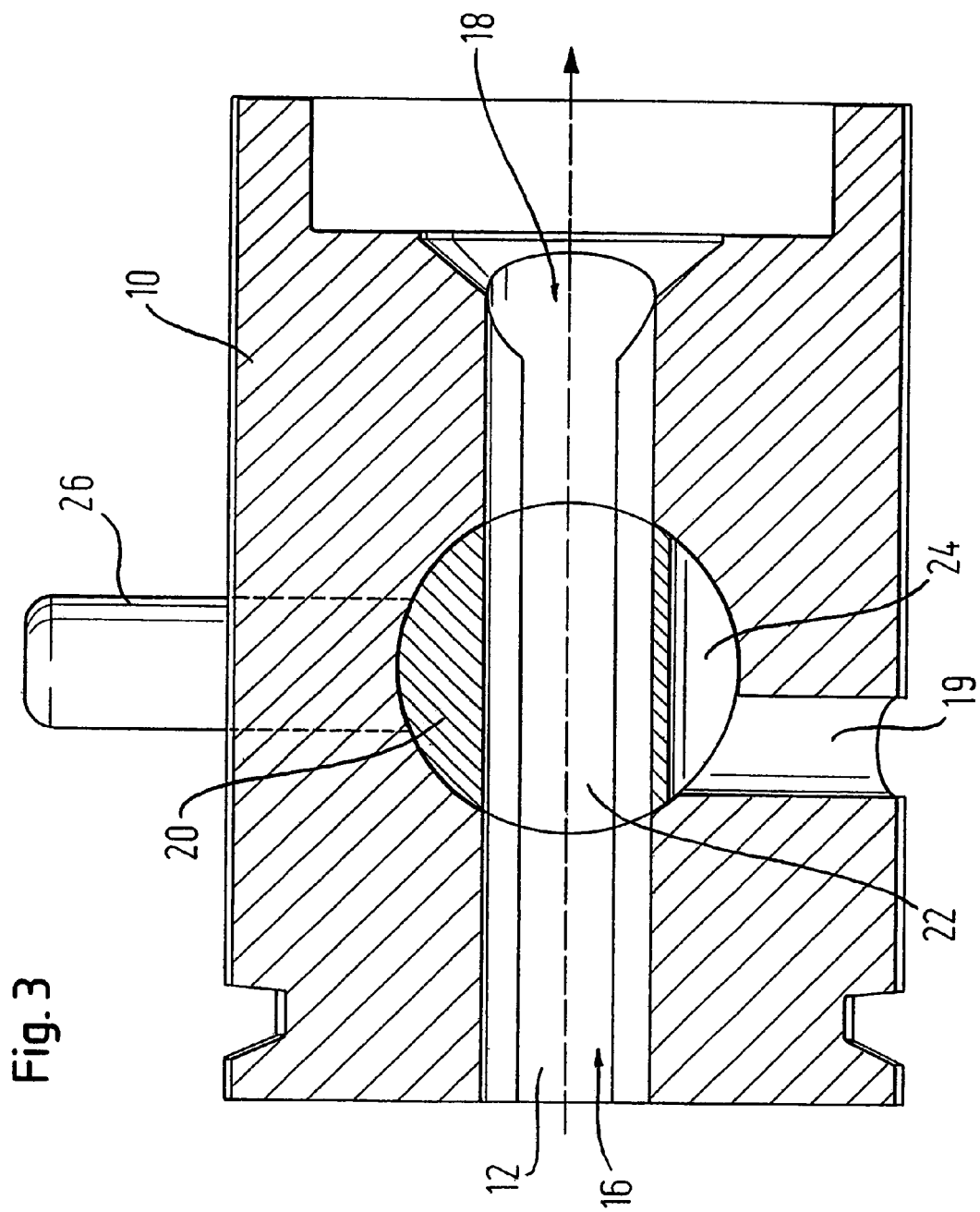
FIG. 3 is a section representation of a diverter valve of the invention in accordance with FIG. 1, with a first bolt position.
Figure 4:
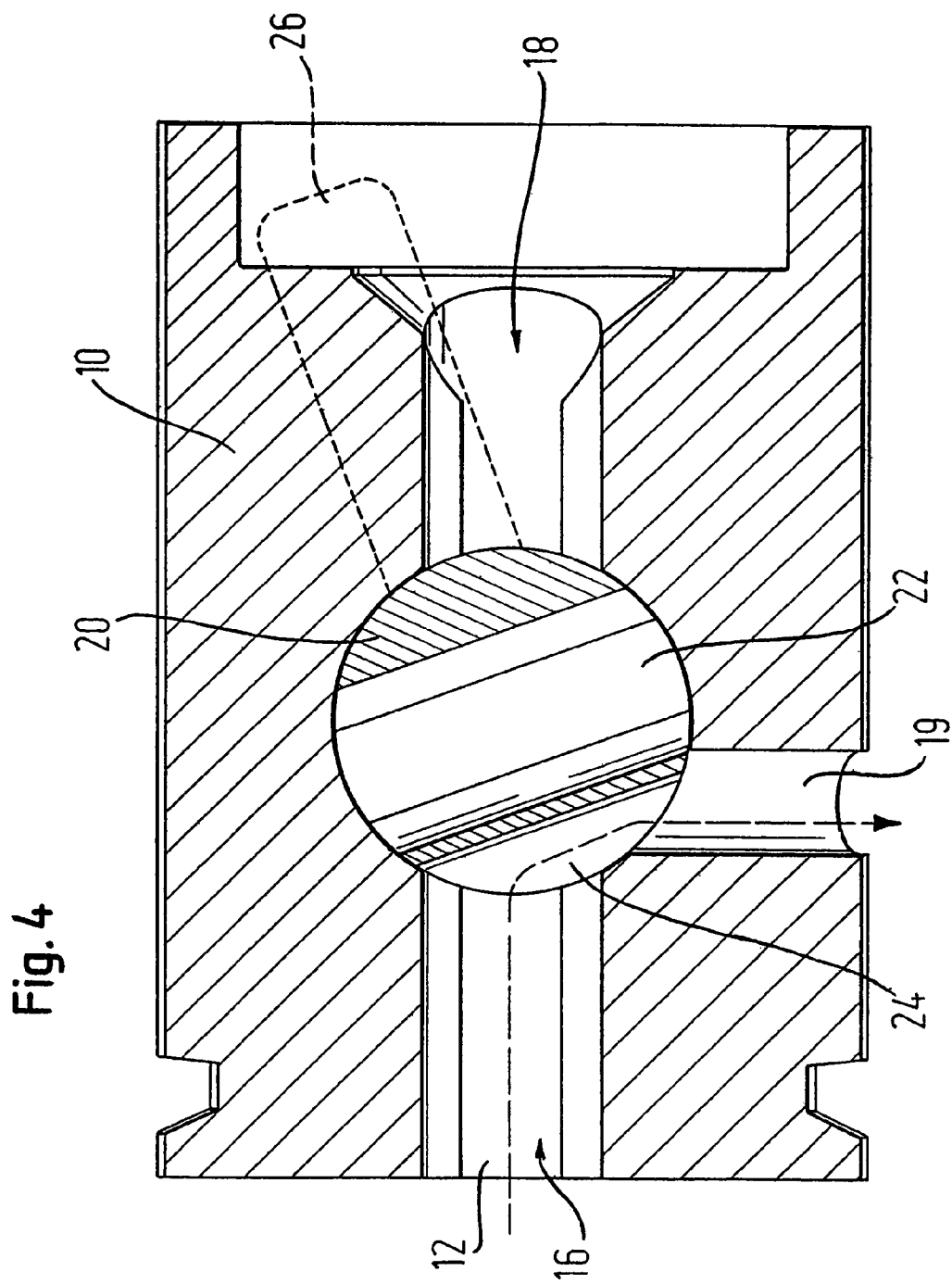
FIG. 4 is a section representation like FIG. 3, but showing a second bolt position.

The principle of operation of the spectacle-type bore holes 12 and 22, as well as the groove-like recess 24, are apparent from the section representations of FIGS. 3 and 4.

A section representation of the diverter valve can be recognized in FIG. 3, which contains a first spectacle-type borehole 12 with an inlet channel 16 and an outlet channel 18. The inlet channel 16 is arranged on the side of the (not represented) extruder and, with reference to its cross section, basically matches the output side screw area of an extruder.

The second flow passage 22 in the valve bolt 10 can be aligned with the first flow passage 12 by corresponding rotation of the valve bolt 10 using the lever 26 so that inlet and outlet openings 16 and 18 can be connected with each other completely through the second flow passage.

The flow passages 12 or 22 are furthermore constructed such that the twin screws arranged in an extruder housing can be pulled out through the overall opening formed with the flow passages 12 and 22.

In the valve position in accordance with FIG. 4, the valve bolt is rotated about 80° clockwise so that henceforth no connection between the inlet and outlet channel 16 or 18 through the flow passage 22 exists.

In contrast, a fluid connection between the inlet channel 16 and the starting channel 19 is now formed, specifically through the groove-like recess 24 that is formed on the outer periphery of the valve bolt 10. The valve bolt position represented in FIG. 4 represents the starting position, in which melt coming from the extruder is guided downward out of the diverter valve.

The valve position represented in FIG. 3 is the normal operating position in which the melt produced in the extruder can be passed through the diverter valve to another station, for example, a screen apparatus or a granulating apparatus.

The present invention guarantees, in a simple manner, that when using a diverter valve, it is not necessary to forego simple dismounting of extruder screws.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

TABLE OF REFERENCE NUMBERS

10 Housing
12 Housing flow passage
14 Housing borehole
16 Inlet channel
18 Outlet channel
19 Starting channel
20 Valve bolts
22 Bolt opening
24 Groove-like recess
26 Lever

What is claimed is:

1. A diverter valve for an extruder, comprising:
   a valve housing having a first flow passage, the valve housing being fastenable directly or indirectly on an extruder cylinder such that the first flow passage is arranged in alignment with a screw area of the extruder cylinder, wherein a cross-section of the first flow passage is constructed large enough to allow an extruder screw arranged in the extruder to pass through the first flow passage;
   a valve bolt having an axis substantially perpendicular to a flow direction of a liquid or a melt in the valve housing, the valve bolt having at least one further flow passage which can be arranged in a position aligned with the first flow passage of the valve housing, a cross-section of the further flow passage being constructed large enough to pass the extruder screw through the further flow passage; and
   wherein the valve bolt is arranged adjustably in the valve housing.

2. The diverter valve according to claim 1, wherein the first and further flow passages are constructed in the form of spectacle-type boreholes for a twin-screw extruder.

3. The diverter valve according to claim 1, wherein a groove-like recess is arranged on an outer periphery of the valve bolt, in addition to the further flow passage, axially at the same height with said further flow passage, but radially offset therefrom.

4. The diverter valve according to claim 2, wherein a groove-like recess is arranged on an outer periphery of the valve bolt, in addition to the further flow passage, axially at the same height with said further flow passage, but radially offset therefrom.

5. The diverter valve according to claim 3, wherein the first flow passage includes an inlet channel and an outlet channel in the valve housing, which channels can be connected for flow purposes through the further flow passage in the valve bolt.

6. The diverter valve according to claim 4, wherein the first flow passage includes an inlet channel and an outlet channel in the valve housing, which channels can be connected for flow purposes through the further flow passage in the valve bolt.

7. The diverter valve according to claim 3, wherein an inlet channel and a starting channel are provided in the valve housing, which channels can be connected with each other for flow purposes through the groove-like recess in the valve bolt.

8. The diverter valve according to claim 4, wherein an inlet channel and a starting channel are provided in the valve housing, which channels can be connected with each other for flow purposes through the groove-like recess in the valve bolt.

9. The diverter valve according to claim 5, wherein an inlet channel and a starting channel are provided in the valve housing, which channels can be connected with each other for flow purposes through the groove-like recess in the valve bolt.

10. The diverter valve according to claim 6, wherein an inlet channel and a starting channel are provided in the valve housing, which channels can be connected with each other for flow purposes through the groove-like recess in the valve bolt.

11. The diverter valve according to claim 1, wherein the valve bolt is arranged such that a central axis of the extruder screw or the two central axes of the two extruder screws of a twin-screw extruder, intersect with a central axis of the valve bolt.

12. The diverter valve according to claim 2, wherein the valve bolt is arranged such that a central axis of the extruder screw or the two central axes of the two extruder screws of a twin-screw extruder, intersect with a central axis of the valve bolt.

13. The diverter valve according to claim 1, further comprising, a drive for activating the valve bolt.

14. The diverter valve according to claim 2, further comprising, a drive for activating the valve bolt.

15. The diverter valve according to claim 3, further comprising, a drive for activating the valve bolt.

16. The diverter valve according to claim 5, further comprising, a drive for activating the valve bolt.

17. The diverter valve according to claim 1, wherein the diverter valve is incorporated into a housing of an extruder.

* * * * *